UNITED STATES PATENT OFFICE.

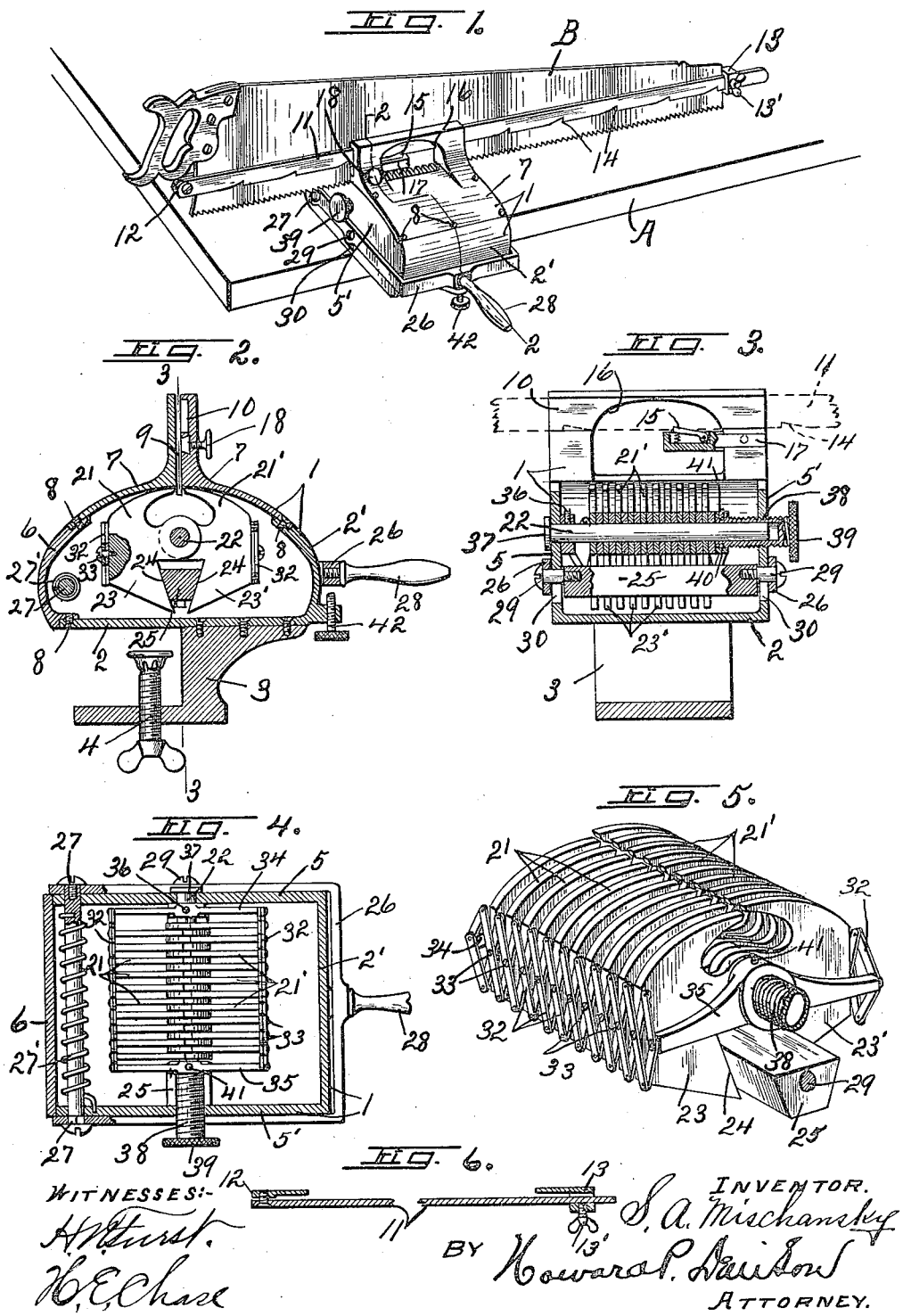

STEPHEN A. MISCHANSKY, OF SYRACUSE, NEW YORK.

SAW-SETTING DEVICE.

1,159,407.  Specification of Letters Patent.  Patented Nov. 9, 1915.

Application filed November 6, 1914. Serial No. 870,581.

*To all whom it may concern:*

Be it known that I, STEPHEN A. MISCHANSKY, a subject of the Emperor of Austria-Hungary, and resident of Syracuse, in the county of Onondaga, in the State of New York, have invented new and useful Improvements in Saw-Setting Devices, of which the following, taken in connection with the accompanying drawings, is a full, clear, and exact description.

This invention relates to certain improvements in saw-setting devices involving the use of a guide for the saw and opposed sets of saw-setting jaws with suitable operating means therefor for setting a series of saw teeth in a single operation.

The main object is to provide a simple and comparatively inexpensive saw-setting device whereby the teeth of a saw may be set more uniformly and expeditiously than has heretofore been practised.

Another object is to enable the same device to be used for setting the teeth of different saws in which such teeth are differently spaced.

A further object is to provide simple means whereby the saw may be adjusted longitudinally a distance corresponding to the number of teeth previously set without special painstaking care or watchfulness on the part of the operator.

A further object is to provide an adjustable stop coöperating with the jaw operating means for gaging the amount of set of the saw teeth so that such set will be uniform for all teeth of the same saw.

Other objects and uses relating to specific parts of the device will be brought out in the following description.

In the drawings Figure 1 is a perspective view of my improved saw-setting device showing a saw in operative relation thereto. Fig. 2 is a transverse vertical sectional view of the saw-setting device taken on line 2—2, Fig. 1, the saw being omitted. Fig. 3 is a longitudinal vertical sectional view taken on the plane of line 3—3, Fig. 2. Fig. 4 is a horizontal sectional view of it through the case or frame of the same device, showing the opposed sets of jaws in top plan, together with the operating means therefor. Fig. 5 is a perspective view of the detached sets of jaws and their supporting spindle together with the vertically movable bar for closing the jaws upon the teeth of a saw and a portion of the screw and lazy-tongs actuated thereby for adjusting the jaws axially. Fig. 6 is a longitudinal sectional view of the gage bar and clamps by which it is secured to a saw, the central portion of the bar being broken away.

This device comprises a hollow frame or casing —1— having a base section —2— secured to a flanged bracket —3— in which is adjustable a screw clamp —4— coöperating with the under side of the base section —2— to clamp the device to a suitable support as a table or bench —A—.

The end walls as —5— and —5'— of the case and also the front side as —2'— are preferably formed integral with the base —2—, while the rear side as —6— and top as —7— are preferably made in separate pieces and afterward secured together by bolts or screws —8— to allow the interior mechanism to be easily installed or removed when desired.

The top section —7— is divided through its longitudinal center to form a slot —9— for receiving and guiding a saw as —B—, the slotted portion of the top being flanged upwardly a sufficient distance to form a convenient support for said saw. The portion of the top at one side of the slot is provided with a guideway or groove —10— for receiving a longitudinally adjustable bar —11— which is provided at its ends with suitable clamps —12— and —13— for engaging the corresponding ends of the saw, the clamp —13— being adjustable lengthwise of the bar —11— to conform to saws of different lengths and being held in its adjusted position by a set-screw —13'—. The lower edge of this bar is provided with a series of notches —14— spaced equi-distance apart and corresponding to the combined lengths of a predetermined number of saw teeth which are to be set in a single operation, said notches being engaged by a detent —15— on the frame —1— to prevent backward movement of the saw, and at the same time to allow such saw to be advanced step by step one notch space at a time as the predetermined number of its teeth are set.

The central portion of the front side of the guide flange for the saw is cut away at —16— to render the pawl and tooth portion of the saw and bar visible therethrough so that the operator may more conveniently determine the position of the notches and teeth of the saw relatively to the jaws, said pawl being adjustable lengthwise of and relatively to the guide bar —11— and frame —1— and for this purpose the pawl is mounted in a recessed slide or plate —17— which is guided in the case —1— and held in its adjusted position by a set-screw —18— in the front side of the upper flange portion of said case —1—.

The means for setting the teeth of the saw comprises opposed sets of jaws —21— and —21'— which are journaled side by side upon a supporting spindle —22— so as to swing about a common axis some distance below the gripping edges of the jaws, the latter being provided with pendent arms —23— below the spindle —22— and having downwardly diverging cam faces —24— for engagement by a wedge shape bar —25— common to all the jaws so that when the bar is forced downwardly it will spread the lower ends of the jaws apart and force the upper edges of the jaws into engagement with the teeth for setting the same.

The means for operating the jaws to set the teeth consist of a U-shape lever —26— extending around the front and sides of the case —1— and having the rear ends of its arms pivoted at —27— to the adjacent ends of the case some distance to the rear of the jaws, while the front end of the lever is provided with a handle —28— by which it may be rocked vertically to impart corresponding movement to the jaw operating bar —25—.

The jaw-operating bar —25— lies wholly within the case —1— and its ends are connected to the opposite arms of the lever —26— by means of pivotal bolts or screws —29— passing through vertically elongated openings or slots —30— in the corresponding ends of the case —1— so as to permit vertical movement of said bar.

The jaws of each set are arranged in spaced relation corresponding to the distance between alternate teeth of the saw and register with the spaces between the jaws of the opposite set so that the opposed sets of jaws engage alternate teeth, one set serving to set its corresponding teeth in one direction, while the other set serve to set its corresponding teeth in the opposite direction.

The front edges of the front set of jaws —21'— and rear edges of the rear set of jaws —21— are preferably disposed in vertical planes parallel with each other for receiving suitable means, as opposite lazy-tongs —32—, by which the jaws of both sets may be adjusted axially to vary the distance between them from center to center to correspond to the spacings of the teeth of different saws, thereby permitting the same device to be used for setting the teeth of different saws in which the spacings of the teeth vary.

Each lazy-tong extends lengthwise of the casing across and in close proximity to the corresponding edges of the particular set of jaws which it is to adjust and their cross connections corresponding in number to the number of jaws of that particular set, the pivotal pins, as —33—, constituting such cross connections being attached to their corresponding jaws, while the ends of the tongs are connected respectively to a stationary cross bar —34— and an adjustable cross bar —35—, as shown more clearly in Figs. 4 and 5.

The hub of the stationary bar —34— is secured by a set-screw —36— to one end of the shaft or spindle —22— close to the inner face of the adjacent end of the case —1—, the outer end of said spindle being provided with a head —37— engaging the outer end of the adjacent end of the case to coöperate with the hub of the stationary arm —34— to hold the shaft or spindle —22— against endwise movement.

The opposite end of the spindle —22— extends through the hubs of the jaws —21— and —21'— and into a threaded sleeve —38— which screws into the corresponding end of the casing —1— and is provided with a hand-piece —39— by which it may be rotated.

The inner end of the threaded sleeve —38— is provided with an annular groove —40— and is surrounded by the hub of the adjustable cross bar —35— having a screw or pin —41— entering the annular groove —40— to lock the arm —35— and sleeve —38— against relative endwise movement, and at the same time, permitting the said sleeve to be rotated independently of the cross bar for adjusting said cross bar axially, and thereby opening and closing both of the lazy-tongs to effect a corresponding axial adjustment of both sets of jaws —21— and —21'—.

The pivotal pin or shaft —27— to which the arms of the lever —26— are secured extends lengthwise of and is journaled in the ends of the case —1— and is surrounded by a coil spring —27'— having one end attached to said shaft and its other end attached to the case for retracting the lever and allowing the jaws to open by their own weight aided by the weight of the central portions of the lazy-tongs tending to sag.

In order that all of the teeth of a saw may be uniformly set and the degree of set changed at will, I have provided an adjustable stop-screw —42— on the front of the case coöperating with the lever —26— to limit the downward movement of said lever as may be desired.

In operation, the saw is placed by hand within the slot —9— and secured to the bar —11— by the clamps —12— and —13— with its toothed edge between and parallel with the gripping edges of the jaws —21— and —21'— after which the bar with the saw thereon and also the jaws are adjusted until the first series of teeth to be set and jaws are properly registered. The pawl —15— is then set to register with the nearest tooth of the bar —11— whereupon the hand-lever —26— may be depressed to close the jaws upon and set that series of teeth. The bar —11— with the saw thereon is then advanced one notch space of the bar —11— to register the next adjacent series of teeth with the jaws which are again operated to set the second series, these operations being repeated until all of the teeth of the saw are set, after which the saw may be removed from the bar —11— and replaced by another one if necessary.

What I claim is:

1. In a saw-setting device, the combination of a spindle, opposite sets of jaws turnable and movable axially on the spindle, screw operated means for adjusting the jaws axially to register with the saw teeth, and lever operated means for rocking the jaws to set the teeth.

2. In a saw-setting device, the combination of a jaw-supporting spindle, opposed sets of jaws journaled on the spindle and adjustable lengthwise thereon, means for rocking the jaws to set the teeth of a saw, and means for adjusting the jaws of both sets axially to vary the space between them to correspond to the spacings of the teeth of different saws.

3. In a saw-setting device, the combination of an inclosing case having means on its lower side for clamping it to a bench or other support and its top provided with a central lengthwise slot forming a saw guide, means for supporting a saw in said guide with its teeth projecting into the interior of the case, coöperative jaws wholly within said case for setting the teeth, and means including a lever on the exterior of the case for forcing the jaws into engagement with the protruding teeth of the saw.

4. In a saw-setting device, the combination with an inclosing case having a guide slot for receiving a saw, of a saw clamping and holding device movable lengthwise of and upon the case along said guide slot, saw-setting jaws mounted wholly within the case, and means on the case for operating the jaws to set the teeth of the saw.

5. In a saw-setting device, the combination of an inclosing case having a lengthwise guide slot in the upper side thereof, means movable lengthwise of and upon the case for supporting a saw in said guide slot, a spindle extending lengthwise of and within the case, opposite sets of jaws mounted on the spindle to rock thereon and wholly within the case, said jaws being provided with cam faces in spaced relation, a bar movable within the case against said cam faces with a wedging action to close the jaws upon the teeth of a saw, and means including a lever on the exterior of the case for operating said bar.

6. In a saw-setting device, the combination of a frame having a lengthwise slot to receive and guide a saw, opposed sets of jaws movable across the slot, those of each set being arranged in spaced relation and registered with the spaces of the other set, means for operating the jaws to close them upon the teeth of a saw, a guide bar slidable on the frame lengthwise of the slot and provided with means for clamping it to a saw, and coöperative devices on the bar and frame, respectively, for gaging the lengthwise movement of the bar and saw to which it is clamped a distance corresponding to the number of teeth operated upon by the jaws, whereby a number of teeth on the saw corresponding to the number of jaws may be operated on successively.

7. In a saw-setting device, the combination of an inclosing case having means on the lower side thereof for clamping it to a bench or other support, said case having its top provided with an upstanding lengthwise flange provided with a lengthwise guide slot for receiving a saw, said flange being provided with a lengthwise way, a bar slidable in said way and provided with means for clamping a saw thereto, means for clamping the bar to said flange, opposed sets of jaws mounted wholly within the case and movable about one and the same axis, and means for operating said jaws to set the teeth of the saw.

8. In a saw-setting device, the combination of a plurality of saw-setting jaws hinged to swing about a common axis, lazy-tongs connections between said jaws, means for operating the jaws to set the teeth of a saw and separate means for operating the lazy-tongs to vary the space between them to correspond to the spacings of the teeth of different saws.

9. In a saw-setting device, opposed sets of saw-setting jaws, lazy-tongs connections between the jaws of both sets, means for operating the jaws to set the teeth of a saw, and separate means for operating both lazy-tongs simultaneously to vary the space between the jaws to correspond to the spacings of the teeth of different saws.

In witness whereof I have hereunto set my hand this 21st day of October, 1914.

STEPHEN A. MISCHANSKY.

Witnesses:
H. E. CHASE,
ALICE M. CANNON.